(12) United States Patent
Hagiwara (10) Patent No.: US 7,116,713 B2
(45) Date of Patent: Oct. 3, 2006

(54) MOVING PICTURE CODING METHOD, MOVING PICTURE CODING APPARATUS, AND MOVING PICTURE CODING PROGRAM

(75) Inventor: Norihisa Hagiwara, Hachiohji (JP)

(73) Assignee: Seiko Epson Corporation, Tokyo (JP)

( * ) Notice: Subject to any disclaimer, the term of this patent is extended or adjusted under 35 U.S.C. 154(b) by 681 days.

(21) Appl. No.: 10/365,499

(22) Filed: Feb. 13, 2003

(65) Prior Publication Data

US 2003/0185300 A1 Oct. 2, 2003

(30) Foreign Application Priority Data

Mar. 29, 2002 (JP) .............................. 2002-097287
Oct. 10, 2002 (JP) .............................. 2002-297589

(51) Int. Cl.
*H04N 7/18* (2006.01)
(52) U.S. Cl. ............................ 375/240.03; 375/240.04; 375/240.05
(58) Field of Classification Search ................................ 375/240.01–240.29
See application file for complete search history.

(56) References Cited

U.S. PATENT DOCUMENTS

| | | | |
|---|---|---|---|
| 5,552,832 A * | 9/1996 | Astle ..................... | 375/240.24 |
| 5,719,961 A | 2/1998 | Normile et al. | |
| 5,737,537 A | 4/1998 | Gardos et al. | |
| 5,748,789 A * | 5/1998 | Lee et al. ................ | 382/243 |
| 6,025,886 A * | 2/2000 | Koda ...................... | 348/700 |
| 6,222,881 B1 * | 4/2001 | Walker .................. | 375/240.03 |
| 6,275,527 B1 | 8/2001 | Bist et al. | |
| 6,310,915 B1 * | 10/2001 | Wells et al. ........... | 375/240.03 |
| 6,430,222 B1 * | 8/2002 | Okada .................... | 375/240.03 |
| 6,711,212 B1 * | 3/2004 | Lin ........................ | 375/240.24 |
| 2002/0094028 A1* | 7/2002 | Kimoto ................. | 375/240.14 |

FOREIGN PATENT DOCUMENTS

| | | |
|---|---|---|
| CN | 1200629 A | 12/1998 |
| EP | 0 973 336 A2 | 1/2000 |
| EP | 1 345 450 A2 | 9/2003 |
| JP | A 10-116267 | 5/1998 |
| JP | A 10-191334 | 7/1998 |

OTHER PUBLICATIONS

Xuan et al.; "Method for detecting all-zero DCT coefficients ahead of discrete cosine transformation and quantisation"; XP006010342; Electronics Letters; vol. 34, No. 19; Sep. 17, 1998..

* cited by examiner

*Primary Examiner*—Andy Rao
(74) *Attorney, Agent, or Firm*—Oliff & Berridge, PLC (57) ABSTRACT

To provide a process for coding the moving picture with higher speed and enhanced efficiency. The present invention provides a moving picture coding method for coding a moving picture of processing object through a predetermined process including a motion estimating process, determining whether or not the predetermined process (e.g., DCT process and quantization process) for a block of processing object can be omitted on the basis of the information regarding a difference between the block and a reference block of a frame to be referenced in coding (i.e., a frame to be referenced in making the motion vector detection), and a quantization parameter for use in a quantization process of the moving picture, performing the predetermined process if it is determined that the predetermined process can not be omitted, and omitting the predetermined process if it is determined that the predetermined process can be omitted and making a set defined value the result of the predetermined process for the block.

41 Claims, 4 Drawing Sheets

MOVING PICTURE CODING METHOD, MOVING PICTURE CODING APPARATUS, AND MOVING PICTURE CODING PROGRAM

BACKGROUND OF THE INVENTION

1. Field of the Invention

The present invention relates to a moving picture coding method and apparatus for coding a moving picture and a moving picture coding program.

2. Description of the Related Art

In recent years, the transmission and reception of the moving picture have been made through a network such as the Internet. When the moving picture is transmitted or received through the network, a process of compressing the moving picture is performed on the transmission side.

Of the processes on the transmission side, a quantization process comprises a process of dividing the DCT coefficients that are obtained by performing the DCT (Discrete Cosine Transform) for the moving picture data. Therefore, the quantization process has a great processing load, and various methods for relieving the load of the quantization process have been conceived.

For example, in Japanese Patent Laid-Open No. 10-191334 and Japanese Patent Laid-Open No. 10-116267, there was disclosed a method for relieving the processing load on the whole by skipping the division in the quantization process in predetermined instances.

In these methods, before the quantization process, a determination is made whether or not all the DCT coefficients contained in the block are zero in the quantization process, and if it is determined that they are all zero, the quantization process is skipped.

For example, supposing that "x" is the DCT coefficient to be quantized, "K" is the divisor based on the quantization parameter, and the arithmetical operation in the quantization is x/K, "y" obtained by the expression y=x/K, is determined as y=0 in a range −K<|x|<K, without making the division. In this case, the figures below the first place of decimals in the division result are discarded.

SUMMARY OF THE INVENTION

However, in the conventional method as above described, a determination is made whether or not all the DCT coefficients (e.g., 64 coefficients) contained in each block of the moving picture data are zero as the quantization results.

However, as a result of determination, all the DCT coefficients contained in the block are often zero as the quantization results. In this case, the results from the process for calculating the DCT coefficients and the process for determining each DCT coefficient are discarded.

That is, if the quantization results are zero, a process for computing the signal to be object for the DCT, a DCT process including the complex arithmetical operations, and the process for determining the DCT coefficients contained in each block are useless, resulting in lower processing efficiency.

It is an object of the present invention to provide a process for coding the moving picture with higher speed and enhanced efficiency.

In order to achieve the above object, according to a first aspect of the present invention, there is provided a moving picture coding method for coding a moving picture of processing object through a predetermined process including a motion estimating process, determining whether or not the predetermined process (e.g., DCT process and quantization process) for a block of processing object can be omitted on the basis of the information regarding a difference (e.g., sum of squared differences, sum of absolute differences or parameter regarding the difference calculated in the motion estimating process) between the block and a reference block of a frame to be referenced in coding (i.e., a frame to be referenced in making the motion vector detection), and a quantization parameter (e.g., "QP" in the embodiment of the invention) for use in a quantization process of the moving picture, performing the predetermined process if it is determined that the predetermined process can not be omitted, and omitting the predetermined process if it is determined that the predetermined process can be omitted and making a set defined value the result of the predetermined process for the block.

Figure 2:
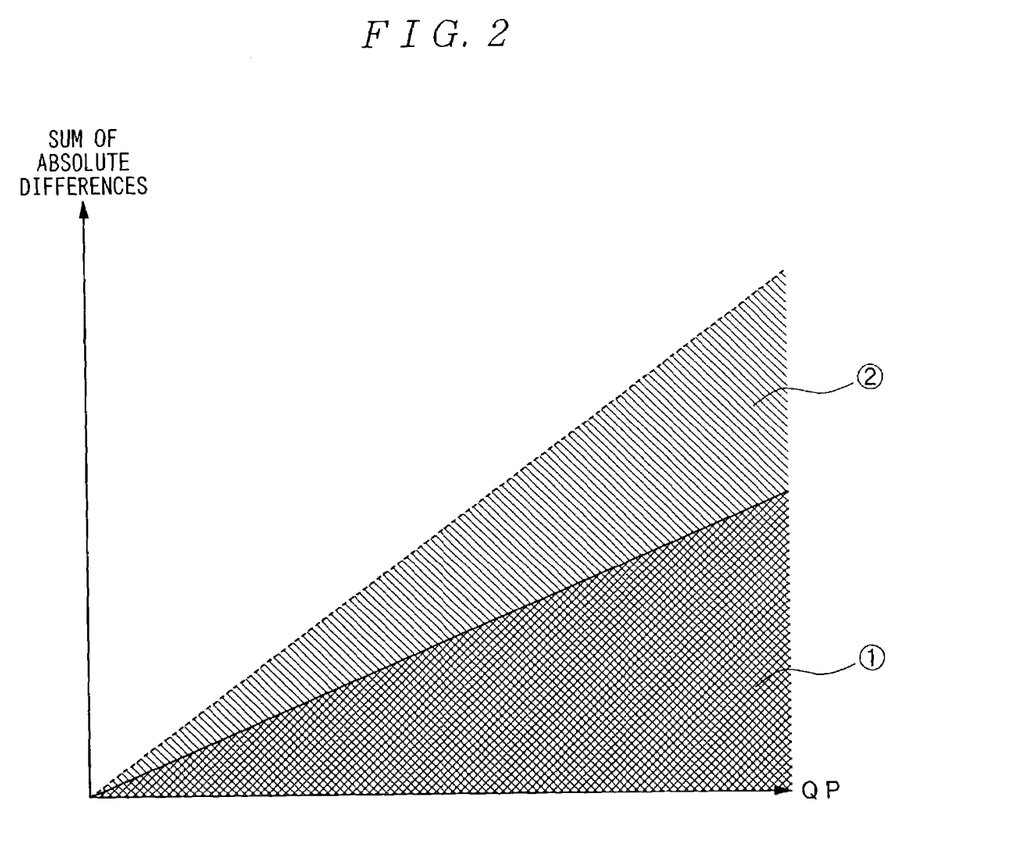
FIG. 2 is a graph showing a determination condition in the relationship between the sum of absolute differences S and the quantization parameter.

Herein, when the predetermined process can be omitted, it is possible to contain an instance where the conditions as represented in the expression (6) or (7) in the embodiment of the invention are eased in a certain range (e.g., corresponding to the area <2> in FIG. 2), in addition to the instance where those conditions are exactly satisfied (e.g., corresponding to the area <1> in FIG. 2).

An invention of claim 2 is the moving picture coding method according to claim 1, wherein when the predetermined process for the block is omitted in a correspondence relation between the information regarding the difference and the quantization parameter, the method may comprise setting a specific characteristic indicating a determination condition as to whether or not the predetermined process for the block can be omitted to have least influence on the image quality of the moving picture, and determining whether or not the predetermined process for the block can be omitted on the basis of the specific characteristic.

In FIG. 2, the specific characteristic indicating the determination condition is set up so that the predetermined process is omitted in the area with a smaller sum of absolute differences, or in the area with a larger quantization parameter.

An invention of claim 3 is the moving picture coding method according to claim 1 or 2, wherein a sum of absolute differences or a sum of squared differences between the block of processing object and the reference block may be calculated in the motion estimating process, and the sum of absolute differences or sum of squared differences may be used as the information regarding the difference.

An invention of claim 4 is the moving picture coding method according to claim 3, wherein a determination may be made whether or not the predetermined process for the block is omitted on the basis of the result of comparing the sum of absolute differences and the quantization parameter in accordance with the following expression,

[Formula 4]

$$S < K(QP)$$

where S is the sum of absolute differences,
QP is the quantization parameter, and
K is a linear function of the quantization parameter QP.

Herein, an example of the comparison expression of S<K(QP) is given such as

[Formula 5]

$$\frac{1}{4}\sum_{x=0}^{N-1}\sum_{Y=0}^{M-1} |f(x, y)| < \frac{5}{2}QP$$

where f (x, y) is a function representing the block,
QP is a quantization parameter,
M, N are positive integers indicating the longitudinal and horizontal sizes (pixels) of the block.

Or $$\frac{1}{4}\sum_{x=0}^{N-1}\sum_{y=0}^{M-1}|f(x, y)| < \frac{QM(u, v)}{16}\left(2QP - \frac{1}{2}\right) \quad \text{[Formula 6]}$$

where f (x, y) is a function representing the block,

QP is a quantization parameter,

QM (u,v) is a quantization matrix,

M, N are positive integers indicating the longitudinal and horizontal sizes (pixels) of the block.

In the above two expressions, a part of ΣΣ|f(x, y)| in the left-hand side means the sum of absolute differences S, and the former of the two expressions is for the H.263 method, and the latter is the comparison expression for the MPEG method.

Moreover, when the sum of absolute differences is employed as an index for determining the similarity between blocks in the pattern matching in the motion estimating process, this is directly made the information regarding the difference. Also, when the sum of squared differences is employed as an index for determining the similarity between blocks in the pattern matching in the motion estimating process, this can be employed by approximating (sum of absolute differences) as indicated in the expression (9) with (square root of sum of squared differences) in the embodiment of the invention. The "sum of absolute differences" as referred to in the claims covers the sum of absolute differences obtained by this approximation.

An invention of claim 5 is the moving picture coding method according to any of claims 1 to 4, wherein if the results of the predetermined process for the block of processing object are not all zero on the basis of the information regarding the difference between the block of processing object and the reference block of the frame to be referenced in coding and the quantization parameter for use in the quantization process of the moving picture, it is determined that the predetermined process can not be omitted, while if the results of the predetermined process for the block of processing object are all zero, it is determined that the predetermined process can be omitted, and the defined value is made zero.

An invention of claim 6 is the moving picture coding method according to any of claims 1 to 4, wherein if a certain percentage or more of the results of the predetermined process for the block of processing object are not zero on the basis of the information regarding the difference between the block of processing object and the reference block of the frame to be referenced in coding and the quantization parameter for use in the quantization process of the moving picture, it is determined that the predetermined process can not be omitted, while if the certain percentage or more of the results of the predetermined process for the block of processing object are zero, it is determined that the predetermined process can be omitted, and the defined value is made zero.

Figure 3:
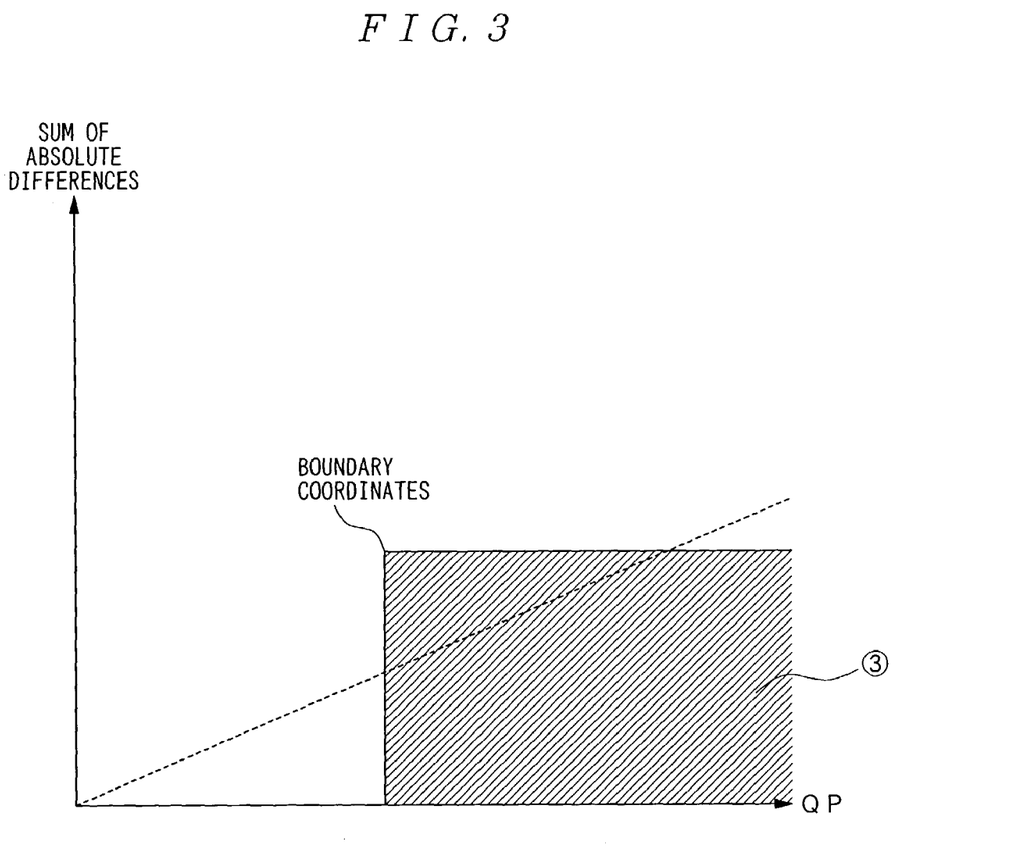
FIG. 3 is a graph showing one example of the determination condition in the relationship between the sum of absolute differences S and the quantization parameter.
Figure 4:
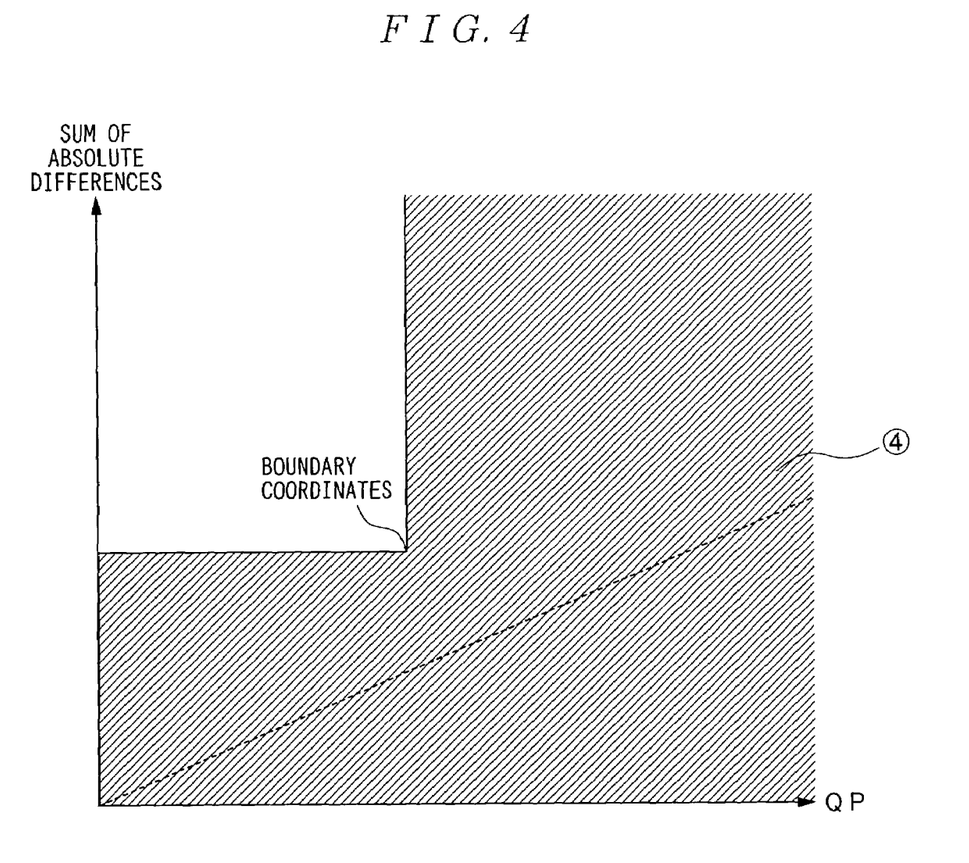
FIG. 4 is a graph showing another example of the determination condition in the relationship between the sum of absolute differences S and the quantization parameter.

An invention of claim 7 is the moving picture coding method according to any of claims 1 to 3, wherein a determination is made whether or not the predetermined process for the block is omitted on the basis of the results of comparing the information regarding the difference and the quantization parameter with respective thresholds (e.g., sum of absolute differences and quantization parameter value that are decided by the boundary coordinates of FIG. 3 and FIG. 4).

An invention of claim 8 is the moving picture coding method according to any of claims 1 to 7, wherein a determination is made whether or not the predetermined process for the block is omitted by referring to a required time of the coding process that is performed for the block of processing object, on the basis of the required time and a predicted time of the coding process.

Herein, the predicted time of the coding process is calculated by computation or actually measured as the processing time for the previous frame.

An invention of claim 9 is the moving picture coding method according to any of claims 1 to 7, wherein a determination is made whether or not the predetermined process for the block of processing object is omitted by referring to the amount of code in the coding process that is performed for the block, on the basis of the amount of code.

An invention of claim 10 is the moving picture coding method according to any of claims 1 to 7, where in a determination is made whether or not the predetermined process for the block of processing object is omitted by referring to the information regarding the texture for the block, on the basis of the information regarding the texture.

The texture as used herein is a parameter indicating an extent of the picture easily perceptible to the human vision, which can be calculated from the sum of absolute differences.

An invention of claim 11 is the moving picture coding method according to any of claims 1 to 7, where in a determination is made whether or not the predetermined process for the block is omitted on the basis of a determination condition that is arbitrarily input.

That is, the determination condition can be decided by the parameter chosen by the user.

An invention of claim 12 is the moving picture coding method according to any of claims 1 to 11, wherein the determination condition for determining whether or not the predetermined process for the block of processing object is omitted is dynamically changed depending on a load state of the coding process.

Accordingly, when the load of the coding process is increased, the determination condition can be altered to the condition where the predetermined process for more blocks is omitted.

An invention of claim 13 is the moving picture coding method according to any of claims 1 to 12, wherein the predetermined process comprises a DCT process and a quantization process.

An invention of claim 14 is a moving picture coding method for intraframe coding a moving picture of processing object through a predetermined process (e.g., DCT or quantization), determining whether or not the predetermined process for a block can be omitted on the basis of the information obtained by adding the values of the blocks contained in a frame of processing object and a quantization parameter for use in a quantization process of the moving picture, performing the predetermined process if it is determined that the predetermined process can not be omitted, and omitting the predetermined process if it is determined that the predetermined process can be omitted and making a set defined value the result of the predetermined process for the block.

For example, the pixel values contained in the block to be coded are added, and a determination is made whether or not the addition results are zero for all the blocks after the DCT process and quantization process, in which if it is determined that the addition results are zero for all the blocks, the predetermined process is omitted, or if it is determined that the addition results are not zero for all the blocks, the predetermined process is performed.

An invention of claim 15 is a moving picture coding apparatus for coding a moving picture of processing object through a predetermined process including a motion estimating process, determining whether or not the predetermined process for a block of processing object can be omitted on the basis of the information regarding a difference between the block and a reference block of a frame to be referenced in coding, and a quantization parameter for use in a quantization process of the moving picture, performing the predetermined process if it is determined that the predetermined process can not be omitted, and omitting the predetermined process if it is determined that the predetermined process can be omitted and making a set defined value the result of the predetermined process for the block.

An invention of claim 16 is the moving picture coding apparatus according to claim 15, wherein when the predetermined process for the block is omitted in a correspondence relation between the information regarding the difference and the quantization parameter, the method comprises setting a specific characteristic indicating a determination condition as to whether or not the predetermined process for the block can be omitted to have least influence on the image quality of the moving picture, and determining whether or not the predetermined process for the block can be omitted on the basis of the specific characteristic.

An invention of claim 17 is the moving picture coding apparatus according to claim 15 or 16, wherein a sum of absolute differences or a sum of squared differences between the block of processing object and the reference block is calculated in the motion estimating process, and the sum of absolute differences or sum of squared differences is used as the information regarding the difference.

An invention of claim 18 is the moving picture coding apparatus according to claim 17, wherein a determination is made whether or not the predetermined process for the block is omitted on the basis of the result of comparing the sum of absolute differences and the quantization parameter in accordance with the following expression,

[Formula 7]

$$S<K(QP)$$

where S is the sum of absolute differences,

QP is the quantization parameter, and

K is a linear function of the quantization parameter QP.

An invention of claim 19 is the moving picture coding apparatus according to any of claims 15 to 18, wherein if the results of the predetermined process for the block of processing object are not all zero on the basis of the information regarding the difference between the block of processing object and the reference block of the frame to be referenced in coding and the quantization parameter for use in the quantization process of the moving picture, it is determined that the predetermined process can not be omitted, while if the results of the predetermined process for the block of processing object are all zero, it is determined that the predetermined process can be omitted, and the defined value is made zero.

An invention of claim 20 is the moving picture coding apparatus according to any of claims 15 to 18, wherein if a certain percentage or more of the results of the predetermined process for the block of processing object are not zero on the basis of the information regarding the difference between the block of processing object and the reference block of the frame to be referenced in coding and the quantization parameter for use in the quantization process of the moving picture, it is determined that the predetermined process can not be omitted, while if the certain percentage or more of the results of the predetermined process for the block of processing object are zero, it is determined that the predetermined process can be omitted, and the defined value is made zero.

An invention of claim 21 is the moving picture coding apparatus according to any of claims 15 to 17, wherein a determination is made whether or not the predetermined process for the block is omitted on the basis of the results of comparing the information regarding the difference and the quantization parameter with respective thresholds.

An invention of claim 22 is the moving picture coding apparatus according to any of claims 15 to 21, wherein a determination is made whether or not the predetermined process for the block of processing object is omitted by referring to a required time of the coding process that is performed for the block, on the basis of the required time and a predicted time of the coding process.

In the moving picture coding apparatus, a determination is made whether or not the predetermined process for the block of processing object is omitted by referring to the amount of code in the coding process that is performed for the block, on the basis of the amount of code.

An invention of claim 24 is the moving picture coding apparatus according to any of claims 15 to 21, wherein a determination is made whether or not the predetermined process for the block of processing object is omitted by referring to the information regarding the texture for the block, on the basis of the information regarding the texture.

An invention of claim 25 is the moving picture coding apparatus according to any of claims 15 to 21, wherein a determination is made whether or not the predetermined process for the block is omitted on the basis of a determination condition that is arbitrarily input.

An invention of claim 25 is the moving picture coding apparatus according to any of claims 15 to 21, wherein the determination condition for determining whether or not the predetermined process for the block of processing object is omitted is dynamically changed depending on a load state of the coding process.

An invention of claim 27 is the moving picture coding apparatus according to any of claims 15 to 26, wherein the predetermined process comprises a DCT process and a quantization process.

An invention of claim 28 is a moving picture coding apparatus for intraframe coding a moving picture of processing object through a predetermined process, determining whether or not the predetermined process for a block can be omitted on the basis of the information obtained by adding the values of the blocks contained in a frame of processing object and a quantization parameter for use in a quantization process of the moving picture, performing the predetermined process if it is determined that the predetermined process can not be omitted, and omitting the predetermined process if it is determined that the predetermined process can be omitted and making a set defined value the result of the predetermined process for the block.

An invention of claim 29 is a moving picture coding program for coding a moving picture of processing object through a predetermined process including a motion estimating process, the program comprising the functions of determining whether or not the predetermined process for a block of processing object can be omitted on the basis of the information regarding a difference between the block and a reference block of a frame to be referenced in coding, and a quantization parameter for use in a quantization process of the moving picture, performing the predetermined process if it is determined that the predetermined process can not be omitted, and omitting the predetermined process if it is determined that the predetermined process can be omitted and making a set defined value the result of the predetermined process for the block.

An invention of claim 30 is the moving picture coding program according to claim 29, wherein when the predetermined process for the block is omitted in a correspondence relation between the information regarding the difference and the quantization parameter, the method comprises setting a specific characteristic indicating a determination condition as to whether or not the predetermined process for the block can be omitted to have least influence on the image quality of the moving picture, and determining whether or not the predetermined process for the block can be omitted on the basis of the specific characteristic.

An invention of claim 31 is the moving picture coding program according to claim 29 or 30, wherein a sum of absolute differences or a sum of squared differences between the block of processing object and the reference block is calculated in the motion estimating process, and the sum of absolute differences or sum of squared differences is used as the information regarding the difference.

An invention of claim 32 is the moving picture coding program according to claim 31, wherein a determination is made whether or not the predetermined process for the block is omitted on the basis of the result of comparing the sum of absolute differences and the quantization parameter in accordance with the following expression,

[Formula 8]

$$S < K(QP)$$

where S is the sum of absolute differences,
QP is the quantization parameter, and
K is a linear function of the quantization parameter QP.

An invention of claim 33 is the moving picture coding program according to any of claims 29 to 32, wherein if the results of the predetermined process for the block of processing object are not all zero on the basis of the information regarding the difference between the block of processing object and the reference block of the frame to be referenced in coding and the quantization parameter for use in the quantization process of the moving picture, it is determined that the predetermined process can not be omitted, while if the results of the predetermined process for the block of processing object are all zero, it is determined that the predetermined process can be omitted, and the defined value is made zero.

An invention of claim 34 is the moving picture coding program according to any of claims 29 to 32, wherein if a certain percentage or more of the results of the predetermined process for the block of processing object are not zero on the basis of the information regarding the difference between the block of processing object and the reference block of the frame to be referenced in coding and the quantization parameter for use in the quantization process of the moving picture, it is determined that the predetermined process can not be omitted, while if the certain percentage or more of the results of the predetermined process for the block of processing object are zero, it is determined that the predetermined process can be omitted, and the defined value is made zero.

An invention of claim 35 is the moving picture coding program according to any of claims 29 to 31, wherein a determination is made whether or not the predetermined process for the block is omitted on the basis of the results of comparing the information regarding the difference and the quantization parameter with respective thresholds.

An invention of claim 36 is the moving picture coding program according to any of claims 29 to 35, wherein a determination is made whether or not the predetermined process for the block of processing object is omitted by referring to a required time of the coding process that is performed for the block, on the basis of the required time and a predicted time of the coding process.

An invention of claim 37 is the moving picture coding program according to any of claim 29 to 35, wherein a determination is made whether or not the predetermined process for the block of processing object is omitted by referring to the amount of code in the coding process that is performed for the block, on the basis of the amount of code.

An invention of claim 38 is the moving picture coding program according to any of claims 29 to 35, wherein a determination is made whether or not the predetermined process for the block of processing object is omitted by referring to the information regarding the texture for the block, on the basis of the information regarding the texture.

An invention of claim 39 is the moving picture coding program according to any of claims 29 to 35, wherein a determination is made whether or not the predetermined process for the block is omitted on the basis of a determination condition that is arbitrarily input.

An invention of claim 40 is the moving picture coding program according to any of claims 29 to 39, wherein the determination condition for determining whether or not the predetermined process for the block of processing object is omitted is dynamically changed depending on a load state of the coding process.

An invention of claim 41 is the moving picture coding program according to any of claims 29 to 40, wherein the predetermined process comprises a DCT process and a quantization process.

An invention of claim 42 is a moving picture coding program for intraframe coding a moving picture of processing object through a predetermined process, the program comprising the functions of determining whether or not the predetermined process for a block can be omitted on the basis of the information obtained by adding the values of the blocks contained in a frame of processing object and a quantization parameter for use in a quantization process of the moving picture, performing the predetermined process if it is determined that the predetermined process can not be omitted, and omitting the predetermined process if it is determined that the predetermined process can be omitted and making a set defined value the result of the predetermined process for the block.

With this invention, employing the information regarding the difference between the block of processing object and the reference block of the frame to be referenced in coding (sum of absolute differences or sum of squared differences for each block), a determination is made whether or not the predetermined process can be omitted. If it is determined that the predetermined process can be omitted for the block, the predetermined process is not performed, and the processing result is set to the defined value. That is, the condition determination is not made for each pixel but in a unit of block.

Accordingly, in coding the moving picture, it is possible to efficiently determine whether or not the predetermined process, particularly the DCT process and the quantization process having a processing load that is not small but is needed without regard to the coding condition, can be omitted. Also, the determination condition enables the predetermined process such as the DCT process and the quantization process to be omitted while suppressing degradation in the quality of moving picture, whereby the coding process of the moving picture can be performed fast and efficiently.

In this invention, since the information sum of absolute differences or sum of squared differences) for use in determining whether or not the predetermined process is omitted is acquired in the motion estimation for coding, the arithmetical operation for the condition determination can be reduced, making the processing more efficient.

Moreover, as a result of determination, when the predetermined process can be omitted, there is no need for making the arithmetical operation to obtain the difference from the reference block of the frame to be referenced in coding at the former stage of the predetermined process, making the coding process faster and more efficient.

Also, when the determination condition is eased in a certain range, the coding process can be made faster with permissible degradation in the quality of moving picture.

More specifically, the predetermined process is preferentially omitted for not only the blocks exactly satisfying the determination condition, but also the blocks not satisfying the determination condition but having less influence on the quality of moving picture, when the predetermined process is omitted. Thereby, it is possible to make the coding process faster, and avoid a situation where the quality of moving picture is extremely degraded with the increased processing load.

DETAILED DESCRIPTION OF THE PREFERRED EMBODIMENTS

The preferred embodiments of a moving picture coding apparatus according to the present invention will be described below with reference to the accompanying drawings.

Figure 1:
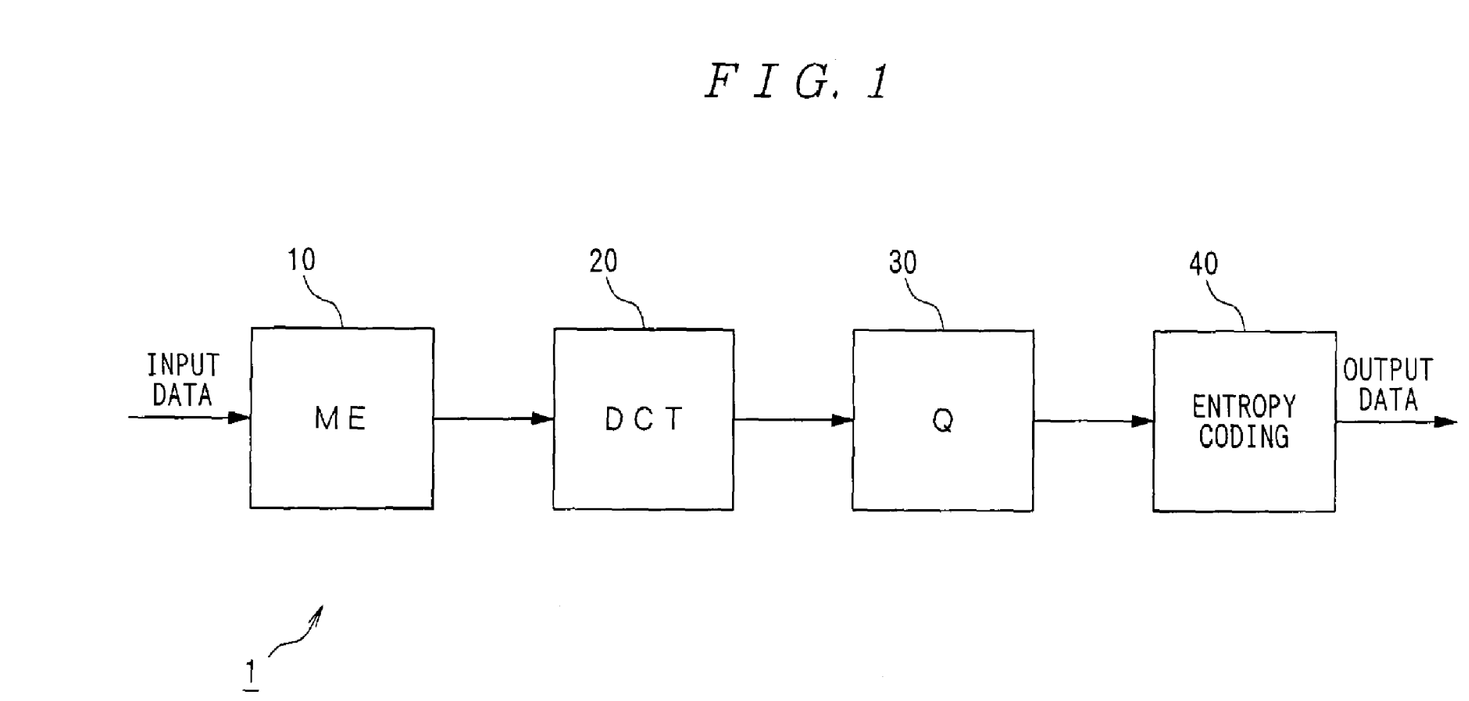
FIG. 1 is a block diagram schematically showing the functional configuration of a moving picture coding apparatus 1 to which the present invention is applied.

FIG. 1 is a block diagram schematically showing the functional configuration of the moving picture coding apparatus 1 to which the present invention is applied. The moving picture coding apparatus 1 is an apparatus for coding the moving picture in accordance with the MPEG-4 (Moving Picture Experts Group phase 4).

In FIG. 1, the moving picture coding apparatus 1 comprises a motion estimating section (ME) 10, a DCT (Discrete Cosine Transform) section 20, a quantizing section (Q) 30, and an entropy coding section 40. The entropy coding section 40, which involves a conventional variable length coding process, is not described, and the motion estimating section 10, the DCT section 20 and the quantizing section 30 are only described. Although the moving picture includes an interframe coding block and an intraframe coding block, a process that handles the intraframe coding block will be described in this embodiment.

The motion estimating section 10 makes the pattern matching of a block to be coded (including a macro block) with each block of a frame to be referenced in coding to acquire a motion vector with the most similar block.

In the pattern matching, a sum of absolute differences or sum of squared differences is employed as an index for determining the similarity between each block.

More specifically, supposing that a (x, y) is the pixel data of the block to be coded and b (x', y') is the pixel data of the block of the frame that is referenced for motion estimation, the sum of absolute differences is given by (1) [Formula 9]

(Sum of absolute differences) =

$$\sum_{x=0}^{N-1}\sum_{y=0}^{N-1}|a(x, y) - b(x' - y')|$$

and the sum of squared differences is given by (2) [Formula 10]

(Sum of squared differences) =

$$\sum_{x=0}^{N-1}\sum_{y=0}^{N-1}(a(x, y) - b(x' - y'))^2$$

In the expressions (1) and (2), N denotes the longitudinal and transversal size (pixels) of the block.

The motion vector is acquired by regarding the block in which the sum of absolute differences or sum of squared differences is at minimum as the most similar block.

The DCT section 20 makes the Discrete Cosine Transform for the pixel data of the frame to be coded into a sum of basic waves (decomposed into frequency components).

More specifically, supposing that f (x, y) is the function of pixel data, the function F (u, v) obtained by subjecting f (x, y) to the Discrete Cosine Transform is given by the following expression.

(3) [Formula 11]

$$F(u, v) =$$

$$\frac{2}{N}C(u)C(v)\sum_{x=0}^{N-1}\sum_{y=0}^{N-1}f(x, y)\cos\frac{(2x+1)u\pi}{2N}\cos\frac{(2y+1)v\pi}{2N}$$

where $C(u), C(v) = \begin{cases} 1/\sqrt{2} \ (u, v = 0) \\ 1 \ (u, v \neq 0) \end{cases}$ The quantizing section 30 quantizes the DCT coefficients calculated by the DCT section 20. Two quantizing methods are defined in the MPEG-4, including an H.263 method and an MPEG method.

More specifically, the quantizing section 30 makes the arithmetical operation including dividing the DCT coefficients by a predetermined quantization parameter, and sets the small values (quantization results) obtained by quantization to the DCT coefficients. As a result, especially when the coding bit rate is low, most of the DCT coefficients often become zero. Therefore, the method for skipping the quantization process in the following way is conventionally taken.

For example, in the case of H.263 method, a quantization result of f (x, y), QF (u, v) can be derived as the following:

$$QF(u, v)=(F(u, v)-QP/2)/(2QP) \text{ for } F(u, v) \geq 0,$$

and $$QF(u, v)=(F(u, v)+QP/2)/(2QP) \text{ for } F(u, v)<0$$

where QP is a quantization parameter.

Thus, F (u, v) and QP are compared for each of the DCT coefficients, and if QF (u, v) is zero on the basis of the result of comparison, the quantization process for its DCT coefficient is skipped.

However, with this method, even if the results of comparison for all the DCT coefficients within the block are zero, F (u, v) and QP are compared for each of the DCT coefficients.

On one hand, if the results of comparison for all the DCT coefficients are zero, the sum of absolute differences or sum of squared differences calculated in the motion estimating section 10 conceivably falls within a fixed ranged.

Accordingly, in this invention, a determination is made whether or not all the DCT coefficients within the block are zero, employing the sum of absolute differences or sum of squared differences calculated in the motion estimating section 10. If all the DCT coefficients are zero, the quantization process is skipped.

The determination condition for determining whether or not all the DCT coefficients contained in the block are zero will be discussed below. Herein, the sum of absolute differences will be mainly discussed.

First of all, the maximum value of the DCT coefficients that can be calculated is obtained from the above expression (3).

(4) [Formula 12]

$$|F(u, v)| =$$

$$\left| \frac{2}{N} C(u)C(v) \sum_{x=0}^{N-1} \sum_{y=0}^{N-1} f(x, y) \cos\frac{(2x+1)u\pi}{2N} \cos\frac{(2y+1)v\pi}{2N} \right|$$

$N, C(u), C(v)$ are positive, then =

$$\frac{2}{N} C(u)C(v) \left| \sum_{x=0}^{N-1} \sum_{y=0}^{N-1} f(x, y) \cos\frac{(2x+1)u\pi}{2N} \cos\frac{(2y+1)v\pi}{2N} \right|$$

Because $|a + b + c + \ldots| \leq |a| + |b| + |c| + \ldots$, $$\leq \frac{2}{N} C(u)C(v) \sum_{x=0}^{N-1} \sum_{y=0}^{N-1} \left| f(x, y) \cos\frac{(2x+1)u\pi}{2N} \cos\frac{(2y+1)v\pi}{2N} \right|$$

Because $-1 \leq \cos\theta \leq +1$, $\leq \frac{2}{N} C(u)C(v) \sum_{x=0}^{N-1} \sum_{y=0}^{N-1} |f(x, y)|$ Because $N = 8$, $C(u), C(v) = 1$, -continued $$1/\sqrt{2}, \leq \frac{1}{4} \sum_{x=0}^{7} \sum_{y=0}^{7} |f(x, y)|$$

Also, the condition of F (u, v) (condition for QF (u, v)=0) where the DCT coefficients are zero in quantizing F (u, v) is such that (5) [Formula 13]

$$QF(u, v) = \begin{cases} (F(u, v) - QP/2)/(2QP) & F(u, v) \geq 0 \\ (F(u, v) + QP/2)/(2QP) & F(u, v) < 0 \end{cases}$$

Thus, $$\begin{cases} (F(u, v) - QP/2)/(2QP) < +1 & F(u, v) \geq 0 \\ (F(u, v) + QP/2)/(2QP) > -1 & F(u, v) < 0 \end{cases}$$

Hence, $$-2QP - \frac{QP}{2} < F(u, v) < +2QP + \frac{QP}{2}$$

Therefore, $$|F(u, v)| < \frac{5}{2}QP$$

That is, if the maximum value of the DCT coefficients after the DCT process is within a range of F (u, v) where the quantization result is zero, all the DCT coefficients become zero in the quantization result. Accordingly, the condition for determining whether or not the quantization result is zero without performing the DCT process and the quantization is given, from the expressions (4) and (5), such that, (6) [Formula 14]

$$|F(u, v)| \leq \frac{1}{4} \sum_{x=0}^{7} \sum_{y=0}^{7} |f(x, y)| < \frac{5}{2}QP$$

where the absolute value sum of f (x) is calculated in the motion estimating section 10.

Accordingly, a determination is made whether or not the absolute value sum of f (x) satisfies the expression (6) after the processing of the motion estimating section 10. If it is determined that the expression (6) is satisfied, the processings of the DCT section 20 and the quantization section 30 are skipped, and for its block, all the DCT coefficients (QF (u, v)) after quantization are set to zero.

In the above, the quantization method has been described in the case of H.263. However, the determination for f (x, y) can be similarly made in the case of MPEG method. That is, when the quantization parameter is QP in the MPEG method, the quantization result QF (u, v) of f (x, y) is represented by

[Formula 15]

$$qf=16F(u, v)//QM(u, v)$$

$$QF(u, v)=qf/(2QP) \quad (7)$$

In the expression (7), it is meant that X//Y is (X+Y/2)/Y when X is greater than or equal to zero, or (X−Y/2)/Y when X is smaller than 0. Also, QM (u, v) is a quantization matrix.

And the conditional expression in the MPEG method is given by the same arithmetical operation as the H.263 method, such that (8) [Formula 16]

$$|F(u, v)| \leq \frac{1}{4}\sum_{x=0}^{7}\sum_{y=0}^{7}|f(x, y)| < \frac{QM(u, v)}{16}\left(2QP - \frac{1}{2}\right)$$

Though the conditional expressions in the H.263 method and the MPEG method are exemplified here, the quantization method is not limited to those methods, but other conditional expressions than the above may be employed.

Moreover, the above determination condition is based on the motion estimation using the sum of absolute differences in the motion estimating section 10, but using this determination condition, an approximate determination condition can be obtained when the motion estimating section 10 uses the sum of squared differences.

That is, setting in the expression (6) such as, (9) [Formula 17]

$$S = \sum_{x=0}^{7}\sum_{y=0}^{7}\left|f(x, y)\right|$$

the sum of squared differences T possibly has the relation,

[Formula 18]

$$S \leq \sqrt{T} \quad (10)$$

Accordingly, when the motion estimating section 10 employs the sum of squared differences in accordance with the expressions (6) and (10), it is possible to determine whether or not all the DCT coefficients after quantization of each block are zero with a certain degree of accuracy. In this case, for the block in which all the DCT coefficients after quantization are actually not zero, it is determined that the DCT coefficients after quantization are zero in processing the block. However, if the faster processing is demanded in exchange for strict accuracy, it is meaningful to perform the processing in the above manner, even with some degradation of image quality. Especially in the real time processing, it is useful when the smooth image transfer is required.

Though the interframe coding has been exemplified in this embodiment, if the intraframe coding is made, it is possible to determine whether or not the DCT process and the quantization process can be omitted, employing the pixel values of the block to be coded, rather than the information regarding the difference from the reference block such as the sum of absolute differences or sum of squared differences.

That is, the DCT and quantization process can be omitted in the same manner as the intraframe coding by adding the pixel values contained in the block to be coded, and determining whether or not the addition results are zero for all the blocks in performing the DCT and quantization process.

As above described, the moving picture coding apparatus 1 to which the invention is applied makes a determination based on the predetermined condition (expression (6) or (7)), employing the sum of absolute differences or sum of squared differences for each block. For the blocks in which it is determined that all the DCT coefficients of the block are zero after quantization, the DCT process and the quantization process are not made and the DCT coefficients after quantization are set to zero. That is, a determination is made whether or not the DCT coefficients after quantization are zero in a unit of block, rather than for each image quality.

Accordingly, the processing load is reduced in coding the moving picture, and it is possible to efficiently determine whether or not the DCT process and the quantization process with a processing load needed without regard to the coding conditions can be omitted. Also, the determination condition is such that the DCT process and the quantization process can be omitted while suppressing the degradation of moving picture, whereby the moving picture coding process can be performed fast and efficiently.

Also, the sum of absolute differences or sum of squared differences that the moving picture coding apparatus 1 uses in determining the omission of the DCT process and the quantization process is acquired in the motion estimation for coding, whereby the arithmetical operation for conditional determination is relieved to make the process more efficient.

Furthermore, as a result of determination, when the DCT process and the quantization process can be omitted, there is no need for making the arithmetical operation for calculating the difference from the predetermined block of the frame to be referenced in coding at the former stage of the DCT process, thereby making the coding process faster and more efficient.

In this embodiment, the determination condition (see the expression (6)) when using the sum of absolute differences is that all the DCT coefficients after quantization are certainly zero. FIG. 2 is a graph showing the determination condition in the relationship between the sum of absolute differences S and the quantization parameter. In FIG. 2, the determination condition based on the expression (6) indicates an area <1>, in which area all the DCT coefficients after quantization are certainly zero.

On the other hand, an area <2> is an area containing the block in which a certain percentage or less (e.g., 50% or less or 30% or less) of the DCT coefficients after quantization are not zero. In addition to the determination condition as represented in the expression (6), it is determined that the DCT coefficients after quantization are zero for the block in which a certain percentage or less of the DCT coefficients after quantization are not zero, with permissible degradation in image quality. On the contrary, because the faster coding process is expected, the determination condition can be eased up to the certain percentage or less (area <2>).

Conventionally, in making the real-time encoding of the moving picture, if the coding of the moving picture is not ended within a predetermined time, the coding process is stopped midway for the frame during the encoding, or the frame during the encoding is discarded.

In this case, the quality of the moving picture after encoding may be extremely degraded such as a defective part of the picture or a missing frame.

Thus, for some blocks in which all the DCT coefficients after quantization are not zero, it is determined that all the DCT coefficients after quantization are zero to reduce the processing load in coding, whereby it is possible to avoid a situation where the quality of the moving picture is extremely degraded.

Each block of the frame is given the order of priority to skip the coding of the block having less influence on the quality of the coded moving picture, whereby it is possible to make the coding process faster while maintaining the quality of the moving picture more properly.

Various methods for making the coding process faster will be described below, including an instance of determining the area <2> as the area where all the DCT coefficients after quantization are zero.

A first method involves determining the area <2> of FIG. 2 as the area where all the DCT coefficients after quantization are zero, as above described.

In FIG. 2, if the area has a smaller sum of absolute differences, the area has a higher percentage of tendency that all the DCT coefficients after quantization are zero. Also, for the block in which all the DCT coefficients after quantization are not zero, even if it is determined that the DCT coefficients after quantization are all zero, the area having a smaller sum of absolute differences has less influence on the quality of the moving picture.

Thus, the gradient of a function indicating a boundary condition (hereinafter referred to as a "boundary line") in FIG. 2 is varied on the basis of a predetermined parameter (parameter that can be acquired in the coding process or arbitrarily input), so that the area to determine that all the DCT coefficients after quantization are zero is expanded from the area <1> to the area <2>.

Herein, the parameter as the reference in varying the gradient of the boundary line will be described below.

In FIG. 2, supposing that the sum of absolute differences is Diff, the following relation holds between the quantization parameter QP and the gradient K.

[Formula 19]

$$Diff = K \times QP \quad (11)$$

Further, the gradient K of the expression (11) may employ the following function.

[Formula 20]

$$K = t'/(T-t) \quad (12)$$

However, t'=min (T, t), where "T" is the maximum time allowable for the coding process, and "t" is the time already taken in the coding process. Therefore, in the case of t=0, the gradient K is zero, or if t>T, the gradient K is infinite.

The "maximum time allowable for the coding process" as used herein is the time in a unit of frame or block (macroblock) to be intended as the coding process time.

As the "T" in the expression (12), the predicted value by computation, or the previous processing result (e.g., processing time of frame to be referenced in coding) may be used.

Though the gradient K is decided with the coding time as a reference in the expression (12), the gradient K is decided on the basis of the processing amount of code, or the texture of coded picture, or input manually by the user in making the coding process.

Herein, when the gradient K is decided on the basis of the texture of the coded picture, the gradient K is varied so that a portion of the picture easily perceptible to the human vision is subjected to the normal coding process, and the other portion less perceptible to the human vision skips the coding process. This texture may be characterized on the basis of the sum of absolute differences, or using various parameters calculated in the motion estimating section 10.

A second method involves determining the area <3> of FIG. 3 as the area where all the DCT coefficients after quantization are zero. In FIG. 3, the characteristic indicated by the dotted line represents the boundary line of the area <1> in FIG. 2.

In this case, the coordinates defining the boundary line (hereinafter referred to as "boundary coordinates") are decided on the basis of the processing amount of code or the texture of coded picture in the same manner as deciding the gradient K in the first method, or manually input by the user in making the coding process.

A third method involves determining the area <4> of FIG. 4 as the area where all the DCT coefficients after quantization are zero. In FIG. 4, the characteristic indicated by the dotted line represents the boundary line of the area <1> in FIG. 2.

In this case, the boundary coordinates are decided on the basis of the processing amount of code or the texture of coded picture in the same manner as in the first method, or manually input by the user in making the coding process.

In the first to third methods, the gradient K or the boundary coordinates are decided in the relation with the sum of absolute differences, as above described. In addition, the gradient K or boundary coordinates are decided in the relation with the sum of squared differences in accordance with the expression (10). Furthermore, the gradient K or boundary line may be decided in the relation with various parameters obtained in the motion estimating process.

In the first to third methods, the boundary line is a straight line. However, the boundary line is not limited to the straight line, but may be a curve.

Moreover, in the first to third methods, the gradient K or boundary coordinates can be dynamically changed depending on the status (processing capability) of the coding process.

In this manner, the coding process is skipped not only for the blocks in which all the DCT coefficients after quantization are zero, but also the blocks in which all the DCT coefficients after quantization are not zero but almost all the DCT coefficients after quantization are zero, whereby an important portion of the frame to be coded is made with higher priority by omitting the coding of less remarkable portion of the frame.

That is, the quality of frame can be kept at some level without ending the coding process halfway of the frame to be coded. Therefore, even if the load of the coding process is increased, the faster coding process is implemented with decreasing the quality of the moving picture extremely.

With this invention, employing the information regarding the difference between the block of processing object and the reference block of the frame to be referenced in coding (sum of absolute differences or sum of squared differences for each block), a determination is made whether or not the predetermined process can be omitted. If it is determined that the predetermined process can be omitted for the block, the predetermined process is not performed, and the processing result is set to the defined value. That is, the condition determination is not made for each pixel but in a unit of block.

Accordingly, in coding the moving picture, it is possible to efficiently determine whether or not the predetermined process, particularly the DCT process and the quantization process having a processing load that is not small but is needed without regard to the coding condition, can be omitted. Also, the determination condition enables the predetermined process such as the DCT process and the quantization process to be omitted while suppressing degradation in the quality of moving picture, whereby the coding process of the moving picture can be performed fast and efficiently.

In this invention, since the information (sum of absolute differences or sum of squared differences) for use in determining whether or not the predetermined process is omitted is acquired in the motion estimation for coding, the arithmetical operation for the condition determination can be reduced, making the processing more efficient.

Moreover, as a result of determination, when the predetermined process can be omitted, there is no need for making the arithmetical operation to obtain the difference from the reference block of the frame to be referenced in coding at the former stage of the predetermined process, making the coding process faster and more efficient.

Also, when the determination condition is eased in a certain range, the coding process can be made faster with permissible degradation in the quality of moving picture.

More specifically, the predetermined process is preferentially omitted for not only the blocks exactly satisfying the determination condition, but also the blocks not satisfying the determination condition but having less influence on the quality of moving picture, when the predetermined process is omitted. Thereby, it is possible to make the coding process faster, and avoid a situation where the quality of moving picture is extremely degraded with the increased processing load.

What is claimed is:

1. A moving picture coding method for coding a moving picture of processing object through a predetermined process including a motion estimating process, comprising:
determining whether or not said predetermined process for a block of processing object can be omitted on the basis of the information regarding a difference between said block and a reference block of a frame to be referenced in coding, and a quantization parameter for use in a quantization process of said moving picture, performing said predetermined process if it is determined that said predetermined process can not be omitted, and omitting said predetermined process if it is determined that said predetermined process can be omitted and making a set defined value the result of said predetermined process for said block, wherein
if a certain percentage or more of the results of said predetermined process for the block of processing object are not zero on the basis of the information regarding the difference between the block of processing object and the reference block of the frame to be referenced in coding and the quantization parameter for use in the quantization process of said moving picture, it is determined that said predetermined process can not be omitted, while if the certain percentage or more of the results of said predetermined process for the block of processing object are zero, it is determined that said predetermined process can be omitted, and said defined value is made zero.

2. The moving picture coding method according to claim 1, wherein when the predetermined process for said block is omitted in a correspondence relation between the information regarding said difference and said quantization parameter, the method comprises setting a specific characteristic indicating a determination condition as to whether or not the predetermined process for said block can be omitted to have least influence on the image quality of the moving picture, and determining whether or not the predetermined process for said block can be omitted on the basis of said specific characteristic.

3. The moving picture coding method according to claim 1, wherein a sum of absolute differences or a sum of squared differences between said block of processing object and said reference block is calculated in said motion estimating process, and said sum of absolute differences or sum of squared differences is used as the information regarding said difference.

4. The moving picture coding method according to claim 3, wherein a determination is made whether or not said predetermined process for said block is omitted on the basis of the result of comparing said sum of absolute differences and said quantization parameter in accordance with the following expression,

[Formula 1]

$$S < K(QP)$$

where S is said sum of absolute differences,
QP is said quantization parameter, and
K is a linear function of said quantization parameter QP.

5. The moving picture coding method according to claim 1, wherein if the results of said predetermined process for the block of processing object are not all zero on the basis of the information regarding the difference between the block of processing object and the reference block of the frame to be referenced in coding and the quantization parameter for use in the quantization process of said moving picture, it is determined that said predetermined process can not be omitted, while if the results of said predetermined process for the block of processing object are all zero, it is determined that said predetermined process can be omitted, and said defined value is made zero.

6. The moving picture coding method according to claim 1, wherein a determination is made whether or not said predetermined process for said block is omitted on the basis of the results of comparing the information regarding said difference and said quantization parameter with respective thresholds.

7. The moving picture coding method according to any claim 1, wherein a determination is made whether or not said predetermined process for said block is omitted by referring to a required time of the coding process that is performed for the block of processing object, on the basis of said required time and a predicted time of the coding process.

8. The moving picture coding method according to claim 1, wherein a determination is made whether or not said predetermined process for the block of processing object is omitted by referring to the amount of code in the coding process that is performed for said block, on the basis of said amount of code.

9. The moving picture coding method according to claim 1, wherein a detennination is made whether or not said predetermined process for the block of processing object is omitted by referring to the information regarding the texture for said block, on the basis of said information regarding the texture.

10. The moving picture coding method according to claim 1, wherein a determination is made whether or not said predetermined process for said block is omitted on the basis of a determination condition that is arbitrarily input.

11. The moving picture coding method according to claim 1, wherein the determination condition for determining whether or not said predetermined process for the block of processing object is omitted is dynamically changed depending on a load state of the coding process.

12. The moving picture coding method according to claim 1, wherein said predetermined process comprises a DCT process and a quantization process.

13. A moving picture coding method for intraframe coding a moving picture of processing object through a predetermined process, comprising:

determining whether or not said predetermined process for a block can be omitted on the basis of the information obtained by adding the values of the blocks contained in a frame of processing object and a quantization parameter for use in a quantization process of said moving picture, performing said predetermined process if it is determined that said predetermined process can not be omitted, and omitting said predetermined process if it is determined that said predetermined process can be omitted and making a set defined value the result of said predetermined process for said block, wherein if a certain percentage or more of the results of said predetermined process for the block of processing object are not zero on the basis of the information regarding the difference between the block of processing object and a reference block of a frame to be referenced in coding and the quantization parameter for use in the quantization process of said moving picture, it is determined that said predetermined process can not be omitted, while if the certain percentage or more of the results of said predetermined process for the block of processing object are zero, it is determined that said predetermined process can be omitted, and said defined value is made zero.

14. A moving picture coding apparatus for coding a moving picture of processing object through a predetermined process including a motion estimating process, comprising:

determining whether or not said predetermined process for a block of processing object can be omitted on the basis of the information regarding a difference between said block and a reference block of a frame to be referenced in coding, and a quantization parameter for use in a quantization process of said moving picture, performing said predetermined process if it is determined that said predetermined process can not be omitted, and omitting said predetermined process if it is determined that said predetermined process can be omitted and making a set defined value the result of said predetermined process for said block, wherein if a certain percentage or more of the results of said predetermined process for the block of processing object are not zero on the basis of the information regarding the difference between the block of processing object and the reference block of the frame to be referenced in coding and the quantization parameter for use in the quantization process of said moving picture, it is determined that said predetermined process can not be omitted, while if the certain percentage or more of the results of said predetermined process for the block of processing object are zero, it is determined that said predetermined process can be omitted, and said defined value is made zero.

15. The moving picture coding apparatus according to claim 14, wherein when the predetermined process for said block is omitted in a correspondence relation between the information regarding said difference and said quantization parameter, the method comprises setting a specific characteristic indicating a determination condition as to whether or not the predetermined process for said block can be omitted to have least influence on the image quality of the moving picture, and determining whether or not the predetermined process for said block can be omitted on the basis of said specific characteristic.

16. The moving picture coding apparatus according to claim 14, wherein a sum of absolute differences or a sum of squared differences between said block of processing object and said reference block is calculated in said motion estimating process, and said sum of absolute differences or sum of squared differences is used as the information regarding said difference.

17. The moving picture coding apparatus according to claim 16, wherein a determination is made whether or not said predetermined process for said block is omitted on the basis of the result of comparing said sum of absolute differences and said quantization parameter in accordance with the following expression,

[Formula 2]

$$S < K(QP)$$

where S is said sum of absolute differences,

QP is said quantization parameter, and

K is a linear function of said quantization parameter QP.

18. The moving picture coding apparatus according to claim 14, wherein if the results of said predetermined process for the block of processing object are not all zero on the basis of the information regarding the difference between the block of processing object and the reference block of the frame to be referenced in coding and the quantization parameter for use in the quantization process of said moving picture, it is determined that said predetermined process can not be omitted, while if the results of said predetermined process for the block of processing object are all zero, it is determined that said predetermined process can be omitted, and said defined value is made zero.

19. The moving picture coding apparatus according to claim 14, wherein if a certain percentage or more of the results of said predetermined process for the block of processing object are not zero on the basis of the information regarding the difference between the block of processing object and the reference block of the frame to be referenced in coding and the quantization parameter for use in the quantization process of said moving picture, it is determined that said predetermined process can not be omitted, while if the certain percentage or more of the results of said predetermined process for the block of processing object are zero, it is determined that said predetermined process can be omitted, and said defined value is made zero.

20. The moving picture coding apparatus according to claim 14, wherein a determination is made whether or not said predetermined process for said block is omitted on the basis of the results of comparing the information regarding said difference and said quantization parameter with respective thresholds.

21. The moving picture coding apparatus according to claim 14, wherein a determination is made whether or not said predetermined process for the block of processing object is omitted by referring to a required time of the coding process that is performed for said block, on the basis of said required time and a predicted time of the coding process.

22. The moving picture coding apparatus according to claim 14, wherein a determination is made whether or not said predetermined process for the block of processing object is omitted by referring to the amount of code in the coding process that is performed for said block, on the basis of said amount of code.

23. The moving picture coding apparatus according to claim 14, wherein a determination is made whether or not said predetermined process for the block of processing object is omitted by referring to the information regarding the texture for said block, on the basis of said information regarding the texture.

24. The moving picture coding apparatus according to claim 14, wherein a determination is made whether or not said predetermined process for said block is omitted on the basis of a determination condition that is arbitrarily input.

25. The moving picture coding apparatus according to claim 14, wherein the determination condition for determining whether or not said predetermined process for the block of processing object is omitted is dynamically changed depending on a load state of the coding process.

26. The moving picture coding apparatus according to claim 14, wherein said predetermined process comprises a DCT process and a quantization process.

27. A moving picture coding apparatus for intraframe coding a moving picture of processing object through a predetermined process, comprising:
determining whether or not said predetermined process for a block can be omitted on the basis of the information obtained by adding the values of the blocks contained in a frame of processing object and a quantization parameter for use in a quantization process of said moving picture, performing said predetermined process if it is determined that said predetermined process can not be omitted, and omitting said predetermined process if it is determined that said predetermined process can be omitted and making a set defined value the result of said predetermined process for said block, wherein
if a certain percentage or more of the results of said predetermined process for the block of processing object are not zero on the basis of the information regarding the difference between the block of processing object and a reference block of a frame to be referenced in coding and the quantization parameter for use in the quantization process of said moving picture, it is determined that said predetermined process can not be omitted, while if the certain percentage or more of the results of said predetermined process for the block of processing object are zero, it is determined that said predetermined process can be omitted, and said defined value is made zero.

28. A moving picture coding program for coding a moving picture of processing object through a predetermined process including a motion estimating process, said program comprising the functions of:
determining whether or not said predetermined process for a block of processing object can be omitted on the basis of the information regarding a difference between said block and a reference block of a frame to be referenced in coding, and a quantization parameter for use in a quantization process of said moving picture, performing said predetermined process if it is determined that said predetermined process can not be omitted, and omitting said predetermined process if it is determined that said predetermined process can be omitted and making a set defined value the result of said predetermined process for said block, wherein
if a certain percentage or more of the results of said predetermined process for the block of processing object are not zero on the basis of the information regarding the difference between the block of processing object and the reference block of the frame to be referenced in coding and the quantization parameter for use in the quantization process of said moving picture, it is determined that said predetermined process can not be omitted, while if the certain percentage or more of the results of said predetermined process for the block of processing object are zero, it is determined that said predetermined process can be omitted, and said defined value is made zero.

29. The moving picture coding program according to claim 28, wherein when the predetermined process for said block is omitted in a correspondence relation between the information regarding said difference and said quantization parameter, the method comprises setting a specific characteristic indicating a determination condition as to whether or not the predetermined process for said block can be omitted to have least influence on the image quality of the moving picture, and determining whether or not the predetermined process for said block can be omitted on the basis of said specific characteristic.

30. The moving picture coding program according to claim 28, wherein a sum of absolute differences or a sum of squared differences between said block of processing object and said reference block is calculated in said motion estimating process, and said sum of absolute differences or sum of squared differences is used as the information regarding said difference.

31. The moving picture coding program according to claim 30, wherein a determination is made whether or not said predetermined process for said block is omitted on the basis of the result of comparing said sum of absolute differences and said quantization parameter in accordance with the following expression,

[Formula 3]

$$S < K(QP)$$

where S is said sum of absolute differences,
QP is said quantization parameter, and
K is a linear function of said quantization parameter QP.

32. The moving picture coding program according to claim 28, wherein if the results of said predetermined process for the block of processing object are not all zero on the basis of the information regarding the difference between the block of processing object and the reference block of the frame to be referenced in coding and the quantization parameter for use in the quantization process of said moving picture, it is determined that said predetermined process can not be omitted, while if the results of said predetermined process for the block of processing object are all zero, it is determined that said predetermined process can be omitted, and said defined value is made zero.

33. The moving picture coding program according to claim 28, wherein if a certain percentage or more of the results of said predetermined process for the block of processing object are not zero on the basis of the information regarding the difference between the block of processing object and the reference block of the frame to be referenced in coding and the quantization parameter for use in the quantization process of said moving picture, it is determined that said predetermined process can not be omitted, while if the certain percentage or more of the results of said predetermined process for the block of processing object are zero, it is determined that said predetermined process can be omitted, and said defined value is made zero.

34. The moving picture coding program according to claim 28, wherein a determination is made whether or not said predetermined process for said block is omitted on the basis of the results of comparing the information regarding said difference and said quantization parameter with respective thresholds.

35. The moving picture coding program according to claim 28, wherein a determination is made whether or not said predetermined process for the block of processing object is omitted by referring to a required time of the coding process that is performed for said block, on the basis of said required time and a predicted time of the coding process.

36. The moving picture coding program according to claim 28, wherein a determination is made whether or not said predetermined process for the block of processing object is omitted by referring to the amount of code in the coding process that is performed for said block, on the basis of said amount of code.

37. The moving picture coding program according to claim 28, wherein a determination is made whether or not said predetermined process for the block of processing object is omitted by referring to the information regarding the texture for said block, on the basis of said information regarding the texture.

38. The moving picture coding program according to claim 28 wherein a determination is made whether or not said predetermined process for said block is omitted on the basis of a determination condition that is arbitrarily input.

39. The moving picture coding program according to claim 28, wherein the detennination condition for determining whether or not said predetermined process for the block of processing object is omitted is dynamically changed depending on a load state of the coding process.

40. The moving picture coding program according to claim 28, wherein said predetermined process comprises a DCT process and a quantization process.

41. A moving picture coding program for intraframe coding a moving picture of processing object through a predetermined process, said program comprising the functions of:

determining whether or not said predetermined process for a block can be omitted on the basis of the information obtained by adding the values of the blocks contained in a frame of processing object and a quantization parameter for use in a quantization process of said moving picture, performing said predetermined process if it is determined that said predetermined process can not be omitted, and omitting said predetermined process if it is determined that said predetermined process can be omitted and making a set defined value the result of said predetermined process for said block, wherein if a certain percentage or more of the results of said predetermined process for the block of processina object are not zero on the basis of the information regarding the difference between the block of processing object and a reference block of a frame to be referenced in coding and the cjuantization parameter for use in the quantization process of said moving picture, it is determined that said predetermined process can not be omitted, while if the certain percentage or more of the results of said predetermined process for the block of processing object are zero, it is determined that said predetermined process can be omitted, and said defined value is made zero.

* * * * *